United States Patent
Yu

(10) Patent No.: US 7,366,531 B2
(45) Date of Patent: Apr. 29, 2008

(54) UPLINK SYNCHRONIZATION DETECTING METHOD OF MOBILE COMMUNICATION SYSTEM

(75) Inventor: Kyung-Mo Yu, Kyunggi-Do (KR)

(73) Assignee: LG Electronics Inc., Seoul (KR)

( * ) Notice: Subject to any disclaimer, the term of this patent is extended or adjusted under 35 U.S.C. 154(b) by 651 days.

(21) Appl. No.: 10/621,463

(22) Filed: Jul. 18, 2003

(65) Prior Publication Data
US 2004/0018842 A1 Jan. 29, 2004

(30) Foreign Application Priority Data
Jul. 20, 2002 (KR) ............... 10-2002-0042788

(51) Int. Cl.
*H04B 7/00* (2006.01)
(52) U.S. Cl. ................... 455/502; 455/423
(58) Field of Classification Search ........... 455/67.14, 455/143, 67.13, 135, 277.2, 13–14, 115.1–2, 455/226.3, 278.1, 296, 208, 242.1, 242.2, 455/69, 522, 502, 63.1; 370/479, 105.1, 370/324, 350, 503; 375/219, 341, 279, 327, 375/293, 149, 240.28, 295, 145, 355
See application file for complete search history.

(56) References Cited

U.S. PATENT DOCUMENTS

| | | | | |
|---|---|---|---|---|
| 5,018,140 A | * | 5/1991 | Lee et al. ............ | 370/514 |
| 5,228,036 A | * | 7/1993 | Okamoto et al. ........ | 370/514 |
| 5,241,548 A | * | 8/1993 | Dillon et al. .......... | 714/822 |
| 5,856,986 A | * | 1/1999 | Sobey ................ | 714/744 |
| 5,937,016 A | * | 8/1999 | Choi ................. | 375/341 |
| 6,137,788 A | | 10/2000 | Sawahashi et al. | |
| 6,788,737 B1 | * | 9/2004 | Miyoshi et al. ........ | 375/219 |
| 6,907,049 B1 | * | 6/2005 | Tamura .............. | 370/479 |
| 7,054,336 B1 | * | 5/2006 | Bendak et al. ......... | 370/509 |
| 2003/0103577 A1 | * | 6/2003 | Harada et al. ......... | 375/295 |
| 2003/0161349 A1 | * | 8/2003 | Marutani ............. | 370/513 |
| 2004/0013169 A1 | * | 1/2004 | Kanemoto et al. ...... | 375/147 |

OTHER PUBLICATIONS

KR Office Action dated Apr. 29, 2005.

\* cited by examiner

*Primary Examiner*—Tu Nguyen
(74) *Attorney, Agent, or Firm*—Ked & Associates, LLP

(57) ABSTRACT

An uplink synchronization detecting method of a mobile communication system is disclosed. A time period in which a quality of a pilot is measured is divided into multiple accumulation sections, a synchronization detection threshold value is set for each section, and a pilot BER calculated for each section and the synchronization detection threshold value set for each section are compared to judge synchronization detection. Accordingly, when the size of a receiving of an uplink is greater and a pilot quality is good, synchronization detection of the uplink can be quickly made.

21 Claims, 4 Drawing Sheets

UPLINK SYNCHRONIZATION DETECTING METHOD OF MOBILE COMMUNICATION SYSTEM

BACKGROUND OF THE INVENTION

1. Field of the Invention

The present invention relates to a mobile communication system and, more particularly, to an uplink synchronization detecting method of the mobile communication system.

2. Background of the Related Art

In a general mobile communication system, a base station checks a synchronization state of uplink radio link sets of each frame. The base station includes a multi-path searcher and a plurality of fingers. The multi-path searcher continuously searches the strength of receiving signals of uplink paths and allocates a path with a greatest path to the finger. Then, the finger receives a component that reaches the base station through the allocated path.

The general uplink physical channel includes a dedicated physical channel (DPCH) which includes, as shown in FIG. 1, a dedicated physical control channel (DPCCH) and a dedicated physical data channel (DPDCH). The dedicated physical control channel includes a pilot field for a pilot pattern, a TPC (Transmit Power Control command) field for controlling a transmission power of a mobile terminal, a TFCI (Transmit Format Combination Indicator) field and an FBI (FeedBack Information) for information to be fed back from the mobile terminal to the base station. The dedicated physical control channel includes a data of a higher layer.

There are various methods for detecting uplink synchronization, including, for example, the following three methods. In a first method, a synchronization detection is performed on the basis of a CRC (Cyclic Redundancy Check) of an uplink receiving data received through the DPDCH. In a second method, a synchronization detection is performed on the basis of a quality of the DPCCH. In a third method, a synchronization detection is performed on the basis of an uplink receiving SIR (Signal to Interference Ratio).

When the synchronization detection is performed on the basis of the CRC of the uplink receiving data, if no CRC error is generated, it is judged to be in an in-synchronization status. When the synchronization detection is performed on the basis of the quality of the uplink DPCCH or when the synchronization detection is performed on the basis of the uplink receiving SIR, if a DPCCH quality for a certain time period (N frames) or a receiving SIR is greater than a synchronization threshold value, it is judged to be in the in-synchronization status.

When the DPCCH quality or when the uplink receiving SIR is measured for a certain time period (N frames) for judging an uplink synchronization, at least N frames are taken for detecting synchronization. And, in order to heighten a reliability of the synchronization detection, the measurement time (N frames) needs to be increased.

In the uplink, an initial transmit power of a mobile terminal becomes very high due to an error of an open-loop power control or because of out-of synchronization due to a temporary deep fading. Accordingly, uplink interference is increased due to the high transmit power of the mobile terminal, resulting in longer times for synchronization detection. In addition, if the high transmit power of the mobile terminal cannot be quickly controlled to a suitable low level due to the longer time used for synchronization detection, the system becomes unstable and uplink capacity is reduced.

Alternatively, in the case that the uplink synchronization detection is performed on the basis of the CRC of the uplink receiving data, a probability of the problem described above can be reduced. However, if the transmit power of the mobile terminal is low, a block error rate is greatly increased and reduces a synchronization detection probability, thereby causing a problem in that significant time is required for uplink synchronization detection.

Moreover, in the case of the uplink, it happens that only the DPCCH is maintained without the DPCDCH, making it difficult to judge an uplink synchronization detection by using only the CRC of the uplink receiving data. The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

Therefore, an object of an embodiment of the present invention is to provide to an uplink synchronization detecting method of a mobile communication system capable of heightening a reliability of synchronization detection.

Another object of an embodiment of the present invention is to quickly perform synchronization detection of a high pilot quality.

Another object of an embodiment of the present invention is to use a pilot quality on the basis of judgment of uplink synchronization detection to quickly perform synchronization detection.

Another object of an embodiment of the present invention is to use multiple time periods for measuring a pilot quality.

Another object of an embodiment of the present invention is to use multiple synchronization detection threshold values.

To achieve at least the above objects in whole or in parts, there is provided an uplink synchronization detecting method of a mobile communication system comprises: comparing a synchronization detection threshold value set by each section of a time period in which a quality of a pilot is measured, and a pilot bit error rate calculated by each section; and judging a synchronization detection by comparing result.

If a pilot bit error rate calculated in a certain section is smaller than the synchronization detection threshold value set for the section, it is judged to be in synchronization status. If a pilot bit error rate calculated for every section is not smaller than a synchronization detection threshold value set for every section, a pilot bit error rate calculated for a first section is compared with a certain synchronization failure threshold value, and then, if the pilot bit error rate of the first section is greater than the synchronization failure threshold value, it is judged to be out of synchronization. The time period for measuring the pilot quality comprises a plurality of frames or slots.

To achieve at least these advantages in whole or in parts, there is further provided an uplink synchronization detecting method of a mobile communication system including: calculating a pilot bit error rate (BER) of an uplink allocated to a finger for a first section; comparing the first pilot BER calculated for the first section with a first synchronization detection threshold value set for the first section; judging that it is in synchronization status if the first pilot BER is smaller than the first synchronization detection threshold value; calculating the pilot BER of the uplink for a second section if the first pilot BER is not smaller than the first synchronization detection threshold value; comparing the second pilot BER calculated for the second section with a second synchronization detection threshold value set for the second section; and judging that it is in synchronization status if the second pilot BER is smaller than the second synchronization detection threshold value.

The uplink synchronization detecting method of a mobile communication system of an embodiment of the present invention further includes: comparing the first pilot BER and a certain synchronization failure threshold value if the second pilot BER is not smaller than the second synchronization detection threshold value; and judging that it is out of synchronization if the first pilot BER is greater than the synchronization failure threshold value.

The first and second sections can be made by frames or can be made by slots. The second section includes the first section and a prescribed numbers of frames to be accumulated to the first section. The second section includes the first section and a prescribed numbers of slots to be accumulated to the first section. There can be more sections besides the first and second sections.

In order not to increase a false alarm probability, the shorter the section for calculating the pilot BER, the smaller the synchronization detection threshold value corresponding to the section. The first synchronization detection threshold value is smaller than the second synchronization detection threshold value.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

An embodiment of the present invention uses a pilot pattern for an uplink synchronization detection. Accordingly, multiple sections for measuring a quality of a pilot and multiple synchronization detection threshold values ($Q_{in}$) are used to judge the uplink synchronization detection. The synchronization detection threshold value ($Q_{in}$) indicates a bit error rate (BER) of a pilot pattern for detecting in-synchronization.

First, an uplink synchronization detection method using one pilot quality measurement time period (N) and a synchronization detection threshold value ($Q_{in}$) (single (N, $Q_{in}$)) will now be described. For example, assuming that the number of pilot bits during N frames is $N_p$, a synchronization detection probability ($p_{sd}$) is obtained by equation (1) below:

$$P_{sd} = \sum_{k=n}^{N_p} Combi(N_p, k) \cdot (1 - p_b)^k \cdot p_b^{N_p - k} \quad (1)$$

wherein $P_b$ indicates an error generation probability in a pilot bit, and $n = N_p \times (1 - Q_{in})$.

Accordingly, the synchronization detection probability ($p_{sd}$) is a probability that if an error generation probability of the pilot bit is $p_b$, error does not occur in pilot bits of more than 'n' number among the total $N_p$ number of pilot bits.

As noted in equation (1), if $P_b$ is fixed, the synchronization detection probability ($p_{sd}$) is determined by 'n' and $N_p$. In this case, because $n = N_p \times (1 - Q_{in})$ and the number of pilot bits per frame is fixed, the synchronization detection probability ($p_{sd}$) is determined depending on the number of frames (N) and the synchronization detection threshold value ($Q_{in}$).

Figure 1:
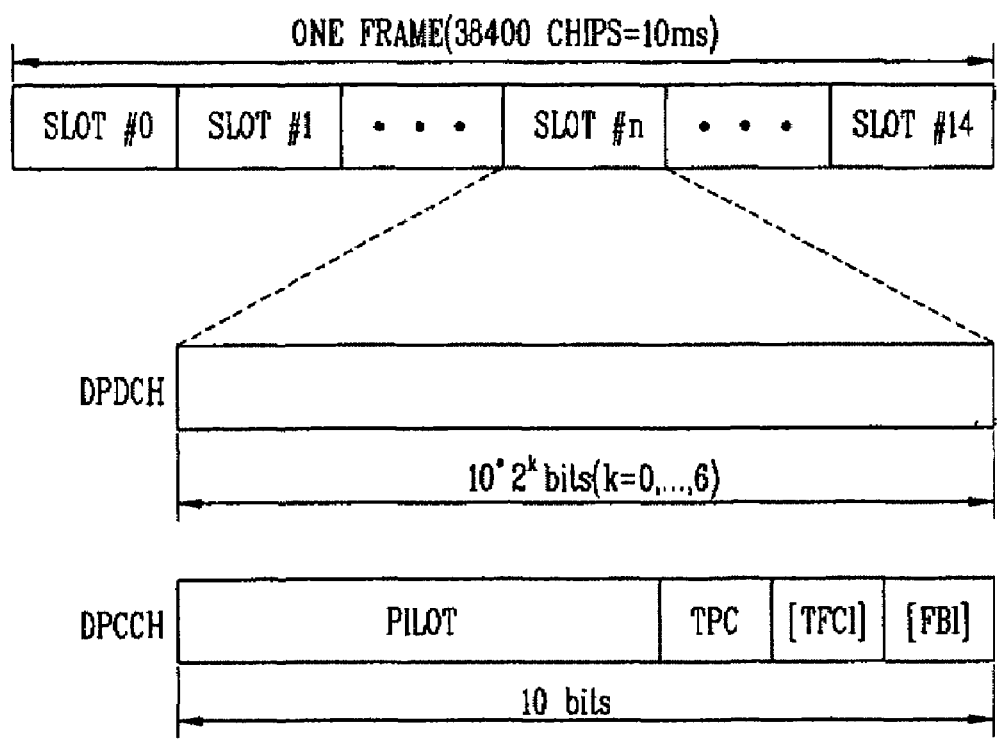
FIG. 1 illustrates a structure of a general uplink physical channel.
Figure 2A:
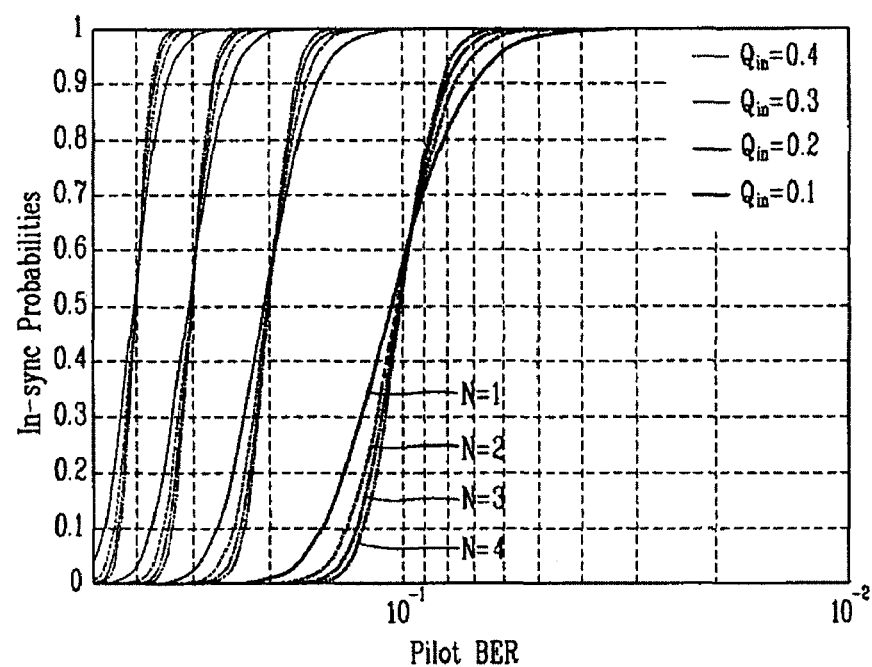
FIGS. 2A and 2B are graphs showing synchronization detection probabilities changing depending on the number of frames and a synchronization detection threshold value (Qin)
Figure 2B:
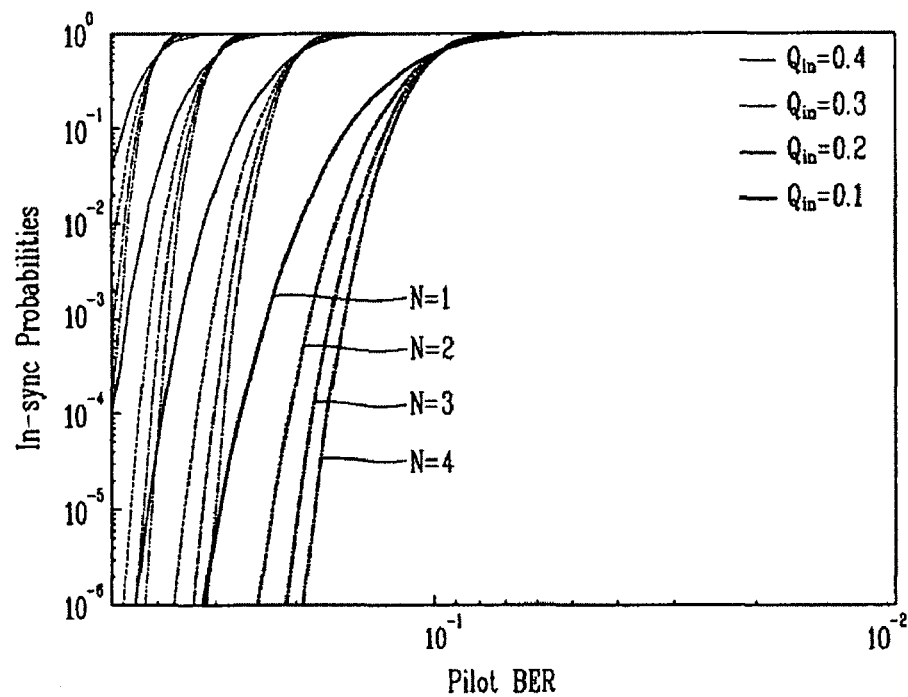

FIGS. 2A and 2B are graphs showing synchronization detection probabilities changing depending on the number of frames and a synchronization detection threshold value ($Q_{in}$). With reference to FIG. 2A, it is noted that the synchronization detection probability moves as synchronization detection threshold value ($Q_{in}$) changes for the same 'N'. FIG. 2B shows the graphs of FIG. 2A as a log scale.

The synchronization detection threshold value ($Q_{in}$) is determined so that a synchronization detection probability of a specific BER of a pilot is above a desired value, and 'N' is determined so that a false alarm probability can be below a desired value for the determined synchronization detection threshold value ($Q_{in}$) (e.g., in order to heighten a reliability of the synchronization detection). The false alarm probability is a probability that misjudges in synchronization which is not actually synchronized.

For example, if an error generation probability ($p_b$) of a pilot bit is below 0.2, $Q_{in} \leq 0.3$ and $N \geq 3$ so that in-synchronization is properly detected and the false alarm probability is below $10^{-6}$. Thus, if 'N' is fixed by a number greater than '3', a minimum measurement time period for synchronization detection is three frames. For purposes of illustration only, a synchronization detection method according to an embodiment of the present invention will now be described.

A single measurement time and a synchronization detection threshold value ($Q_{in}$) are set, and a synchronous failure threshold value ($Q_{out}$) for judging a failure of in-synchronization detection is also set. A multipath searcher of a base station measures a strength of an uplink pilot signal, and allocates a path with the biggest pilot signal strength to a finger. Then, the finger receives signals transmitted through the allocated path. The base station checks whether a path has been allocated to the finger. If the path has been allocated to the finger, the base station counts a pilot bit error of the corresponding path received by the finger and counts the number of frames to measure a pilot bit error rate.

After the pilot bit error rate has been measured as much as pre-set single measurement time, the base station compares the measured bit error rate with the pre-set synchronization detection threshold value ($Q_{in}$). If the measured bit error rate is smaller than the pre-set synchronization detection threshold value ($Q_{in}$), the base station judges that synchronization of the path allocated to the finger has been detected.

However, if the measured bit error rate is not smaller than the synchronization detection threshold value ($Q_{in}$), the base station compares the measured bit error rate and the pre-set synchronization failure threshold value ($Q_{in}$). If the measured bit error rate is greater than the pre-set synchronization failure threshold value ($Q_{in}$), the base station judges a synchronization failure. If, however, the measure bit error rate is not greater than the pre-set synchronization failure threshold value ($Q_{in}$), it returns to the step in which the base station checks whether a path has been allocated to the finger.

The method for performing uplink synchronization detection by using multiple sections in which the quality of pilot is measured and multiple synchronization detection threshold values for judging synchronization detection will now be described. An aspect of the fast synchronization detection method is not to heighten the synchronization detection probability in case of the same pilot quality but to quickly detect synchronization in case of a high pilot quality.

If the synchronization detection time period is long when the transmit power of a mobile terminal is much stronger than a suitable level, a U1 interface increases, causing that the system becomes unstable and a system capacity is reduced. Thus, if the size of a receiving signal of the uplink is great and a pilot quality is good, the synchronization detection method should be changed so that the synchronization detection time period can be minimized.

In an embodiment of the present invention, multiple measurement section and synchronization detection threshold values are set by changing the synchronization detection threshold value ($Q_{in}$) according to measure section (N) while changing the section (N) for measuring the pilot bit error rate. At this time, in order not to increase a false alarm probability, the synchronization detection threshold value ($Q_{in}$) which changes according to the measurement section (N) should have a smaller value as the measurement section (N) becomes shorter. As for the measurement section, the frame unit can be used, or the slot unit can be used for a fast synchronization detection.

Figure 3A:
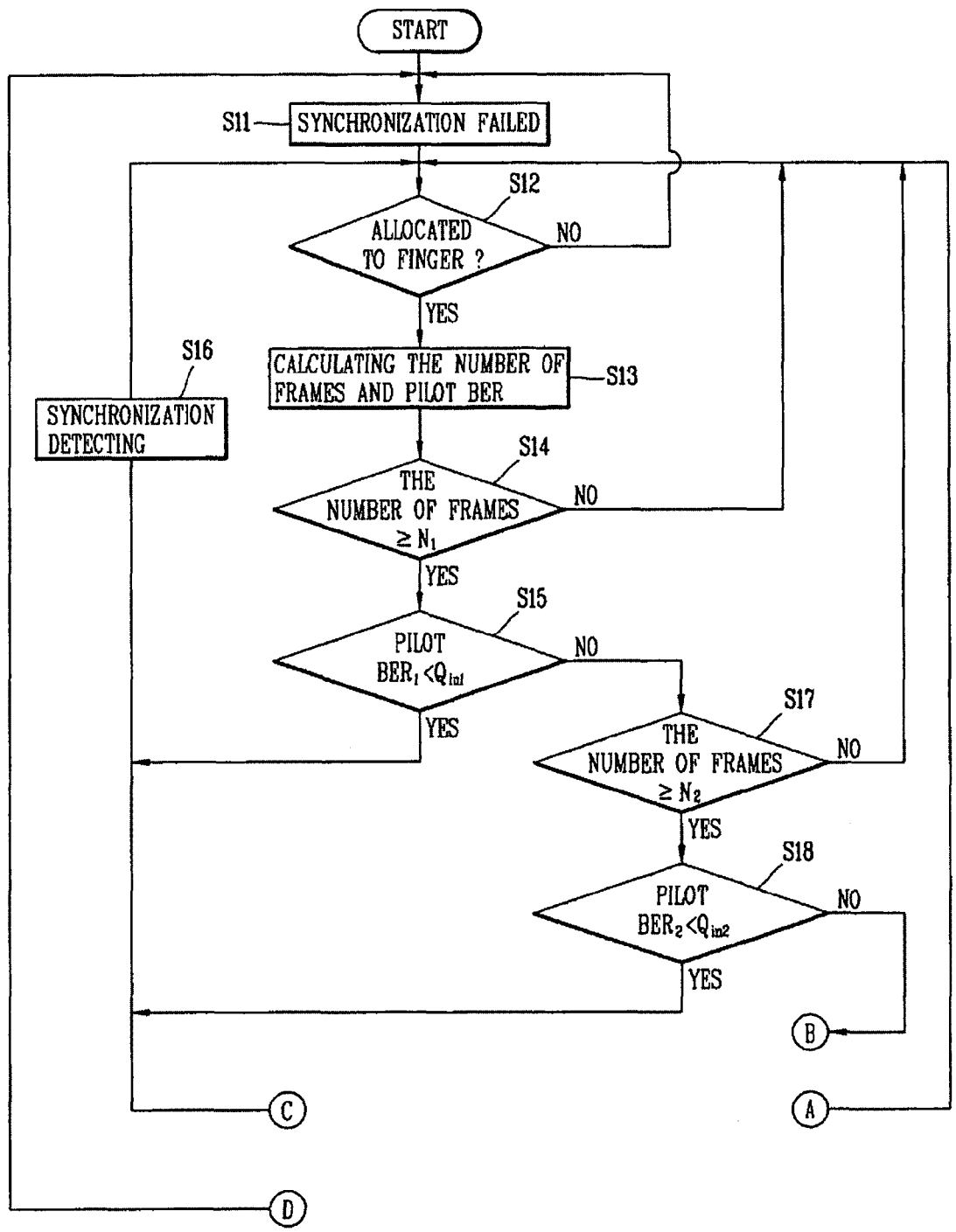
FIGS. 3A and 3B are flow chart of an uplink synchronization detecting method of a mobile communication system in accordance with an embodiment of the present invention.
Figure 3B:
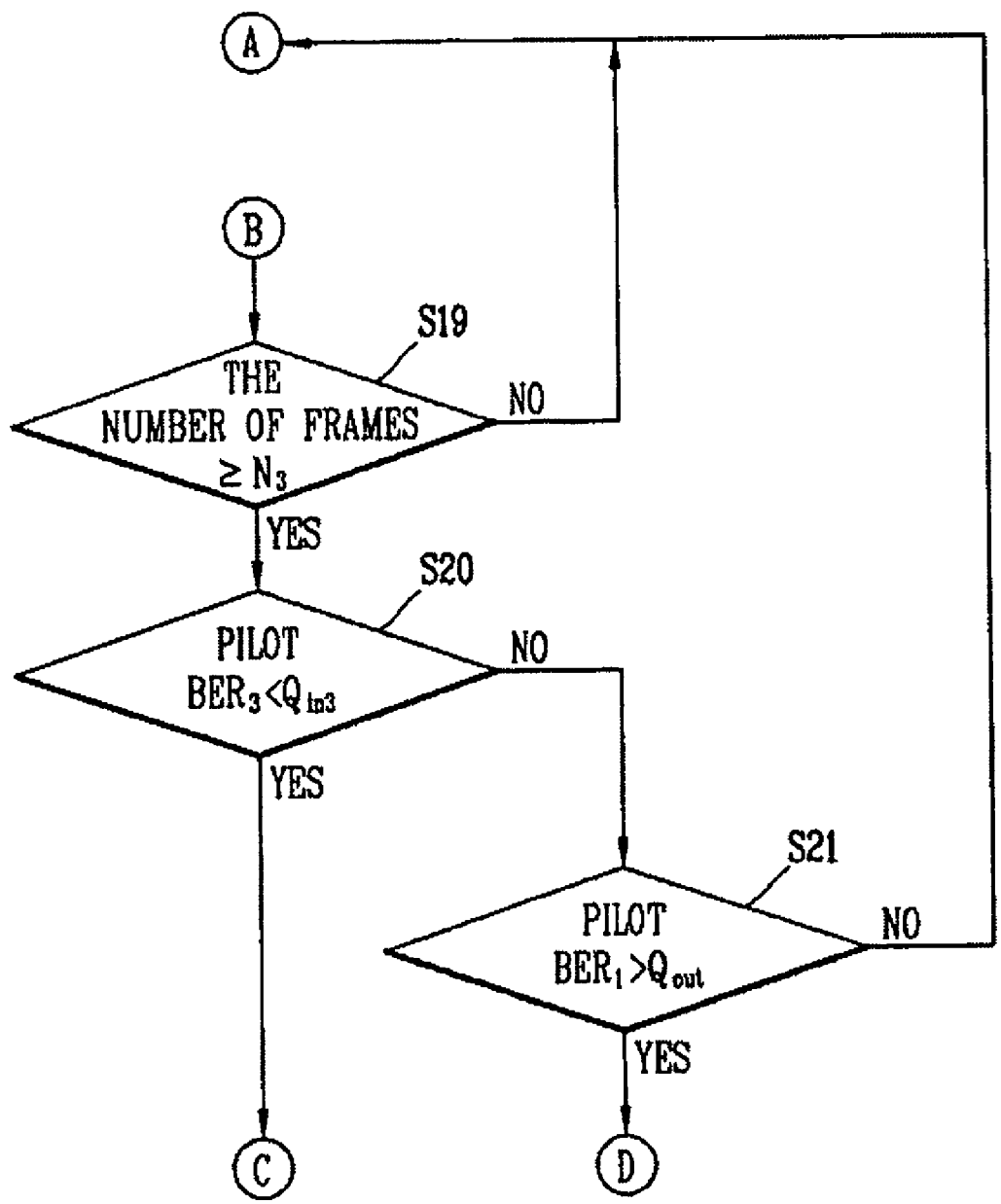

FIGS. 3A and 3B are a flow chart of an uplink synchronization detecting method of a mobile communication system in accordance with an embodiment of the present invention. The initial status is set as a synchronization failure status (step S11). Thereafter, the multiple path searcher of the base station searches a path of the uplink, the searched path is allocated to the finger, and the finger receives signals transmitted through the allocated path.

The base station checks whether a path has been allocated to the finger (step S12). If no path has been allocated, it returns to the step S11, the synchronization failure status. If, however, a path has been allocated to the finger, the base station counts a pilot bit error of the corresponding path allocated to the finger and the frames to measure a pilot bit error rate (step S13) (herein, the measurement section is set by the unit of frame).

The base station checks whether the number of counted frames is smaller than $N_1$ (step S14). If the number of frames is smaller than $N_1$, the base station receives the pilot bits continuously from the path allocated to the finger and measures a pilot bit error rate. If, however, the number of counted frames is not smaller than $N_1$, the base station compares the pilot bit error rate measured for $N_1$ (pilot $BERL_1$) and a pre-set synchronization detection threshold value ($Q_{in1}$) (step S15).

If the measure pilot BER1 is smaller than the synchronization detection threshold value ($Q_{in1}$), the base station judges that synchronization of the path (uplink) allocated to the finger has been detected (step S16). If, however, the measured pilot $BER_1$ is not smaller than the synchronization detection threshold value ($Q_{in1}$), the base station checks whether the number of counted frames is smaller than $N_2$ (step S17). (herein, if $N_1$ is 1 frame, $N_2$ becomes 2 frames).

If the number of counted frames is smaller than $N_2$, the base station continuously receives the pilot bits through the finger and measures a pilot bit error rate. If, however, the number of counted frames is not smaller than $N_2$, the base station compares the pilot bit error rate ($BER_2$) measured for $N_2$ and the pre-set synchronization detection threshold value ($Q_{in2}$) (step S18).

If the measured pilot $BER_2$ is smaller than the synchronization detection threshold value ($Q_{in2}$), the base station judges that synchronization of the path (uplink) allocated to the finger has been detected (step S16). If, however, the measured pilot $BER_2$ is not smaller than the synchronization detection threshold value ($Q_{in2}$), the base station checks whether the number of counted frames is smaller than $N_3$ (step S19) (Herein, $N_3$ may become 3 frames).

If the number of counted frames is smaller than $N_3$, the base station continuously receives the pilot bits through the finger and measures a pilot bit error rate. If, however, the number of counted frames is not smaller than $N_3$, the base station compares the pilot bit error rate ($BER_3$) measured for $N_3$ and a pre-set synchronization detection threshold value ($Q_{in3}$) (step S20).

If the measured pilot bit error rate ($BER_3$) is smaller than the synchronization detection threshold value ($Q_{in3}$), the base station judges that synchronization of the path (uplink) allocated to the finger has been detected (step S16). If, however, the measured pilot bit error rate ($BER_3$) is not smaller than the synchronization detection threshold value ($Q_{in3}$), the base station compares the pilot $BER_1$ measured for $N_1$ and a synchronization failure threshold value ($Q_{out}$) (step S21).

If the pilot BER1 measured for $N_1$ is greater than the synchronization failure threshold value ($Q_{out}$), the base station judges that the synchronization detection has been failed (step S11). If, however, the pilot $BER_1$ measured for $N_1$ is not greater than the synchronization failure threshold value ($Q_{out}$), the base station proceeds to the step S12.

In the above descriptions, the measurement sections, e.g., the frame sections are set to $N_1$, $N_2$ and $N_3$, and the synchronization detection threshold values ($Q_{in}$) for each frame section are set to $Q_{in1}$, $Q_{in2}$ and $Q_{in3}$. However those skilled in the art will appreciate that the invention is not limited thereto, and more frame sections ($N_1$, $N_2$, $N_3$, . . . , $N_n$) and corresponding synchronization detection threshold values ($Q_{in1}$, $Q_{in2}$, $Q_{in3}$, . . . , $Q_{inn}$) can be set.

In the case of using the uplink synchronization detection method according to an embodiment of the present invention, the synchronization detection probability ($p_{sd}$) is obtained by equation (2) below:

$$\begin{aligned}P_{sd} &= Pr\{p_1 \le Q_{in1}\} + Pr\{p_1 > Q_{in1}\}Pr\{p_2 \le Q_{in2}\} + \\ &\quad Pr\{p_1 > Q_{in1}\}Pr\{p_2 > Q_{in2}\}Pr\{p_3 \le Q_{in3}\} \\ &= Pr\{p_3 \le Q_{in3}\} + Pr\{p_3 > Q_{in3}\}Pr\{p_2 \le Q_{in2}\} + \\ &\quad Pr\{p_3 > Q_{in3}\}Pr\{p_2 > Q_{in2}\}Pr\{p_1 \le Q_{in1}\} \ge Pr\{p_3 \le Q_{in3}\}\end{aligned} \quad (2)$$

wherein $p_1$, $p_2$ and $p_3$ are respectively the pilot $BER_1$, $BER_2$ and $BER_3$ for the $N_1$, $N_2$ and $N_3$ frame sections.

It is noted from equation (2) that the multiple (N, $Q_{in}$) synchronization detection probabilities have a greater value than or the same value as the single ($N_3$, $Q_{in3}$) synchronization detection probability ($p_{sd}$). In addition, in the case of using the uplink synchronization detection method according to an embodiment of the present invention, a synchronization detection time period (T) is obtained by equation (3) below:

$$T=N_3 Pr\{p_1>Q_{in1}\}Pr\{p_2>Q_{in2}\}Pr\{P_3<Q_{in3}\} \quad (3)$$

In equation (3), if a pilot bit error rate is 0.1, $N_1=1$, $N_2=2$, $N_3=3$ and $Q_{in1}=0.18$, $Q_{in2}=0.25$, $Q_{in3}=0.3$, a synchronization detection time period (T) according to the uplink synchronization detection method according to an embodiment of the present invention is about 1 frame (T≈1 frame). However, if $N_3=3$ frames and $Q_{in3}=0.3$, a synchronization detection time (T) according to the uplink synchronization detection method using the single ($N_3$, $Q_{in3}$) is about 3 frames (T∓3 frames).

Accordingly, in case of the SIR region that $Pr\{p_1<Q_{in1}\}\approx 1$ (in case that the SIR is a good region), the multiple (N, $Q_{in}$) synchronization detection time is reduced to ⅓ compared to the single ($N_3$, $Q_{in3}$) synchronization detection time. As so far described, the uplink synchronization detecting method of a mobile communication system has at least one of the following features.

By using the pilot quality on the basis of the judgment of uplink synchronization detection and using the multiple sections in which the pilot quality is measured and the multiple synchronization detection threshold values, when the size of a receiving signal of the uplink is great and the pilot quality is good, the synchronization detection can be quickly established and reliability of the synchronization detection can be increased. In addition, because the synchronization detection can be quickly established when the pilot quality is good, even if a transmit power of the mobile terminal is greater than a suitable level, the system can remain stable and can be prevented from being degraded in its capacity. Moreover, the synchronization detection time period can be judged by the unit of frame, and also can be judged by the slot for a faster synchronization detection in a range that reliability is maintained.

The invention has been described in connection with a number of exemplary embodiments directed to methods. To facilitate an understanding of the invention, many aspects of the methods previously described in terms of sequences of actions to be performed can be performed by elements of a computer-based system. It will be recognized that in each of the embodiments, the various actions could be performed by specialized circuits (e.g., discrete logic gates interconnected to perform a specialized function), by program instructions being executed by one or more processors, or by a combination of both. Thus, the various aspects of the invention may be embodied in many different forms, and all such forms are contemplated to be within the scope of the invention. For each of the various aspects of the invention, any such form of an embodiment may be referred to herein as "logic configured to" perform a described action. Accordingly, those skilled in the art will recognize an embodiment of the present invention includes an apparatus (e.g., a base station) comprising the logic configured to perform the sequences described in the foregoing description.

The foregoing embodiments and advantages are merely exemplary and are not to be construed as limiting the present invention. The present teaching can be readily applied to other types of apparatuses. The description of embodiments of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. An uplink synchronization detecting method of a mobile communication system comprising:
   calculating a first pilot bit error rate (BER) of an uplink allocated to a finger, for a first section;
   comparing the first pilot BER calculated for the first section with a first synchronization detection threshold value set for the first section;
   judging the uplink is in synchronization status when the first pilot BER is smaller than the first synchronization detection threshold value;
   calculating a second pilot BER of the uplink for a second section when the first pilot BER is not smaller than the first synchronization detection threshold value;
   comparing the second pilot BER calculated for the second section with a second synchronization detection threshold value set for the second section; and
   judging the uplink is in synchronization status when the second pilot BER is smaller than the second synchronization detection threshold value.

2. The method of claim 1, further comprising:
   comparing the first pilot BER and a synchronization failure threshold value, when the second pilot BER is not smaller than the second synchronization detection threshold value; and
   judging the uplink is out of synchronization if the first pilot BER is greater than the synchronization failure threshold value.

3. The method of claim 1, wherein the fllst and second sections comprise frames or slots.

4. The method of claim 3, wherein the second section includes the first section and a prescribed numbers of frames to be accumulated to the first section.

5. The method of claim 3, wherein the second section includes the first section and a prescribed number of slots to be accumulated to the first section.

6. The method of claim 1, further comprising other sections in addition to the first and second sections.

7. The method of claim 1, wherein a length of the section for calculating the pilot BER corresponds to the synchronization detection threshold value.

8. The method of claim 7, wherein as the length of the section for calculating the pilot BER decreases, the synchronization detection threshold value decreases.

9. The method of claim 1, wherein the first synchronization detection threshold value is smaller than the second synchronization detection threshold value.

10. A mobile communication system, comprising:
    first logic configured to compare a synchronization detection threshold value set for each corresponding section of a time period, wherein a pilot bit error rate is calculated for the each corresponding section;
    second logic configured to determine a synchronization detection for each section based on a result of said comparison, wherein the first logic includes:
      logic confi ured to calculate a pilot bit error rate (BER) of an uplink allocated to a finger, for a first section, and
      logic configured to compare the first pilot BER calculated for the first section with a first synchronization detection threshold value set for the first section, and
    wherein the second logic includes:
      logic configured to determine the uplink is in synchronization status if the first pilot BER is smaller than the first synchronization detection threshold value, wherein the first logic further includes:

logic configured to calculate a second pilot BER of the uplink for a second section when the first pilot BER is not smaller than the first synchronization detection threshold value, and logic configured to compare the second pilot BER calculated for the second section with a second synchronization detection threshold value set for the second section, and wherein the second logic further includes:

logic configured to determine the uplink is in synchronization status when the second pilot BER is smaller than the second synchronization detection threshold value.

11. The system of claim 10, wherein the time period includes at least one of a plurality of frames and a plurality of slots.

12. The system of claim 10, wherein when the result of the comparison indicates the pilot bit error rate is smaller than the synchronization detection threshold value set for the corresponding section, synchronization is indicated.

13. The system of claim 10, wherein when the result of the comparison for every section of said time period indicates the pilot bit error rate of every section is not smaller than a corresponding synchronization detection threshold value set for every section, a pilot bit error rate calculated for a first section is compared with a synchronization failure threshold value, and when the pilot bit error rate of the first section is greater than the synchronization failure threshold value, a synchronization failure is indicated.

14. The system of claim 10, further comprising:

logic configured to compare the first pilot BER and a synchronization failure threshold value, when the second pilot BER is not smaller than the second synchronization detection threshold value; and logic configured to determine the uplink is out of synchronization if the first pilot BER is greater than the synchronization failure threshold value.

15. The system of claim 10, wherein the first and second sections comprise frames or slots.

16. the system of claim 10, wherein the second section includes the first section and additional frames to be added to the first section.

17. the system of claim 10, wherein the second section includes the first section and additional slots to be added to the first section.

18. The system of claim 10, wherein the first synchronization detection threshold value is smaller than the second synchronization detection threshold value.

19. The system of claim 10, wherein a length of the section for calculating the pilot BER corresponds to the synchronization detection threshold value.

20. The system of claim 19, wherein as the length of the section for calculating the pilot BER decreases, the synchronization detection threshold value decreases.

21. The system of claim 10, wherein the system is a base station.

* * * * *